United States Patent
Kanov et al.

(10) Patent No.: US 9,674,699 B2
(45) Date of Patent: Jun. 6, 2017

(54) SYSTEM AND METHODS FOR SECURE COMMUNICATION IN MOBILE DEVICES

(71) Applicant: SAP SE, Walldorf (DE)

(72) Inventors: Yordan Kanov, Mezdra (BG); Yanislav Mihaylov, Sofia (BG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/461,165

(22) Filed: Aug. 15, 2014

(65) Prior Publication Data

US 2016/0050193 A1    Feb. 18, 2016

(51) Int. Cl.
| | | |
|---|---|---|
| *G06F 7/04* | (2006.01) | |
| *H04W 12/06* | (2009.01) | |
| *H04L 29/06* | (2006.01) | |
| *H04W 88/02* | (2009.01) | |

(52) U.S. Cl.
CPC ......... *H04W 12/06* (2013.01); *H04L 63/0815* (2013.01); *H04W 88/02* (2013.01)

(58) Field of Classification Search
CPC ........ H04L 63/08; H04W 12/06; H04W 88/02
USPC .......................................................... 726/7
See application file for complete search history.

(56) References Cited

U.S. PATENT DOCUMENTS

| | | | | |
|---|---|---|---|---|
| 2014/0181518 A1* | 6/2014 | Kim | ..................... | G06F 21/6281 713/168 |
| 2014/0189799 A1* | 7/2014 | Lu | ..................................... | 726/4 |
| 2014/0310792 A1* | 10/2014 | Hyland | ............... | H04L 63/0861 726/8 |
| 2014/0331060 A1* | 11/2014 | Hayton | ................... | G06F 21/31 713/186 |
| 2014/0380428 A1* | 12/2014 | Kobayashi | ........................ | 726/4 |
| 2015/0188907 A1* | 7/2015 | Khalid | ................ | H04L 63/0815 726/8 |

OTHER PUBLICATIONS

Feng Yang, "A Secure analysis of the OAuth protocol," 2013, IEEE, oages 271-276.*
Zubair Ahmad Khattak et al., "Analysis of Open Environment Sign-in Schemes-Privacy Enhanced & Trustworthy Approach," Journal of advances in information technology, vol. 2, No. 2, May 2011, pp. 109-121.*

* cited by examiner

*Primary Examiner* — Luu Pham
*Assistant Examiner* — Canh Le
(74) *Attorney, Agent, or Firm* — Jones Day

(57) ABSTRACT

A system and a method for secure communication in a mobile computing device involve obtaining, by a first program installed on the mobile computing device, an access credential from an authentication server on behalf of a second program installed on the mobile computing device. The second program submits the access credential to a remote resource as proof that the second program has been authenticated by the authentication server. Upon successful verification of the access credential, the remote resource allows the second program to access data.

20 Claims, 5 Drawing Sheets

SYSTEM AND METHODS FOR SECURE COMMUNICATION IN MOBILE DEVICES

FIELD OF THE INVENTION

The present invention relates to a system and methods for secure communication in mobile computing devices. In particular, example embodiments of the present invention relate to access by a software program on a mobile device to a remote resource. Example embodiments of the present invention also relate to various ways in which data communicated to a program on a mobile device are protected against interception by unauthorized programs.

BACKGROUND INFORMATION

With the proliferation of mobile computing and the ability of software programs from any number of publishers to request access to remote resources, protection of those resources has become a great concern. The popularity of mobile computing has led many businesses to make software programs (commonly referred to as applications or "apps") available for accessing enterprise data through mobile computing devices such as smartphones, tablets and other wireless devices. Additionally, downloading and installing software programs on a mobile device is relatively easy. Numerous apps are available for immediate download, for example through the Apple iTunes Store or Google Play Store.

The ability to install programs for both business and personal use means that at any given time, numerous programs may be installed on any given mobile device. From an enterprise perspective, this is alarming because an administrator of an enterprise resource (e.g., a private web server for a company) typically cannot or does not check each program that is installed on the user's device to ensure that the program is not malicious. This can be especially true if the user is not an employee of the company. Users generally have limited technical expertise and therefore cannot be expected to check the programs being installed. Thus, since the programs cannot be checked at the time of installation, a need exists for ways in which private resources are protected against unauthorized access by programs already installed on the user's device. Anti-malware and virus protection programs are employed on personal computers to protect against malicious software. However, the use of such protection programs is limited in the mobile computing context. Further, the sheer number of different apps that are available for download makes it difficult for publishers of protection programs to keep up with the latest malicious software.

SUMMARY

Example embodiments of the present invention relate to a system and a method for creating an access credential for a program (referred to herein as a third-party app) that requests access to a private resource. The access credential may be generated by an authentication server using a standard authentication protocol such as OAuth and enables the third-party app to access the private resource.

In an example embodiment, an intermediary program manages user credentials (e.g., a username and/or a password) so that the user's credentials need not be directly supplied to the third-party app. Once the user is signed onto the intermediary program, no further communication of user credentials may be required. The same user credentials may be used for multiple third-party apps, allowing the user to change the user credentials via the intermediary program without having to repeat the same change with each third-party app.

In an example embodiment, the intermediary program obtains access credentials in the form of an access token on behalf of the third-party app. Prior to doing so, the intermediary program may obtain its own access token together with a refresh token.

In an example embodiment, communication between the intermediary program and third-party apps is unsecured. To ensure that the access token is transmitted to the third-party app rather than to a malicious program masquerading as the third-party app, the intermediary program encrypts the access token using a public key of the third-party app. Thus, the access token can only be decrypted by the third-party app using its own private key.

In an example embodiment, the intermediary program obtains information that uniquely identifies the third-party app so that the access token is guaranteed to be returned to the third-party app. This allows the access token to be securely transmitted without encryption.

In an example embodiment where the platform is Android, the information that uniquely identifies the third-party app is a combination of the app's package name and a certificate with which the app is signed. The intermediary program may store a hash of the certificates of authorized publishers together with a list of package names of authorized third-party apps. Information supplied by third-party apps is then checked against the stored certificate/package name information.

In an example embodiment, the authentication server includes an administration program that enables control of access by third-party apps. The administration program includes a graphical user interface by which third-party apps can be registered and unregistered with the authentication server. Access token requests are processed only for registered apps. Additionally, the administration program may allow access tokens to be manually revoked for a selected third-party app so that the selected app's current access token is invalidated. The revocation may also disable the selected app from obtaining new access tokens, but the selected app may remain registered. Thus, access is dynamically configurable.

DETAILED DESCRIPTION

Example embodiments of the present invention relate to a system and methods for secure communication between an app installed on a mobile device and a private resource located remotely from the mobile device. In example embodiments, an intermediary program obtains access credentials from an authentication server on behalf of the app. Alternatively, the app may obtain its access credentials directly from the authentication server. For convenience, the resource requesting app is referred to herein as a third-party app because oftentimes, the entity that provides the authentication server and the intermediary program is not the publisher of the requesting app. However, the third-party app may also encompass apps that are published by the same entity associated with the authentication server and the intermediary program.

In an example embodiment, a method for secure communication in a mobile computing device includes obtaining, by a first program installed on the mobile computing device, a first access credential from an authentication server on behalf of a second program installed on the mobile computing device; submitting, by the second program, the first access credential to a remote resource as proof that the second program has been authenticated by the authentication server; and accessing, by the second program, data at the remote resource in response to a successful verification of the first access credential.

In an example embodiment, a system for secure communication in a mobile computing device includes an authentication server and a mobile device on which a first program and a second program are installed. The first program obtains a first access credential from the authentication server on behalf of the second program, the second program submits the first access credential to a remote resource as proof that the second program has been authenticated by the authentication server, and the second program accesses data at the remote resource in response to a successful verification of the first access credential.

Figure 1:
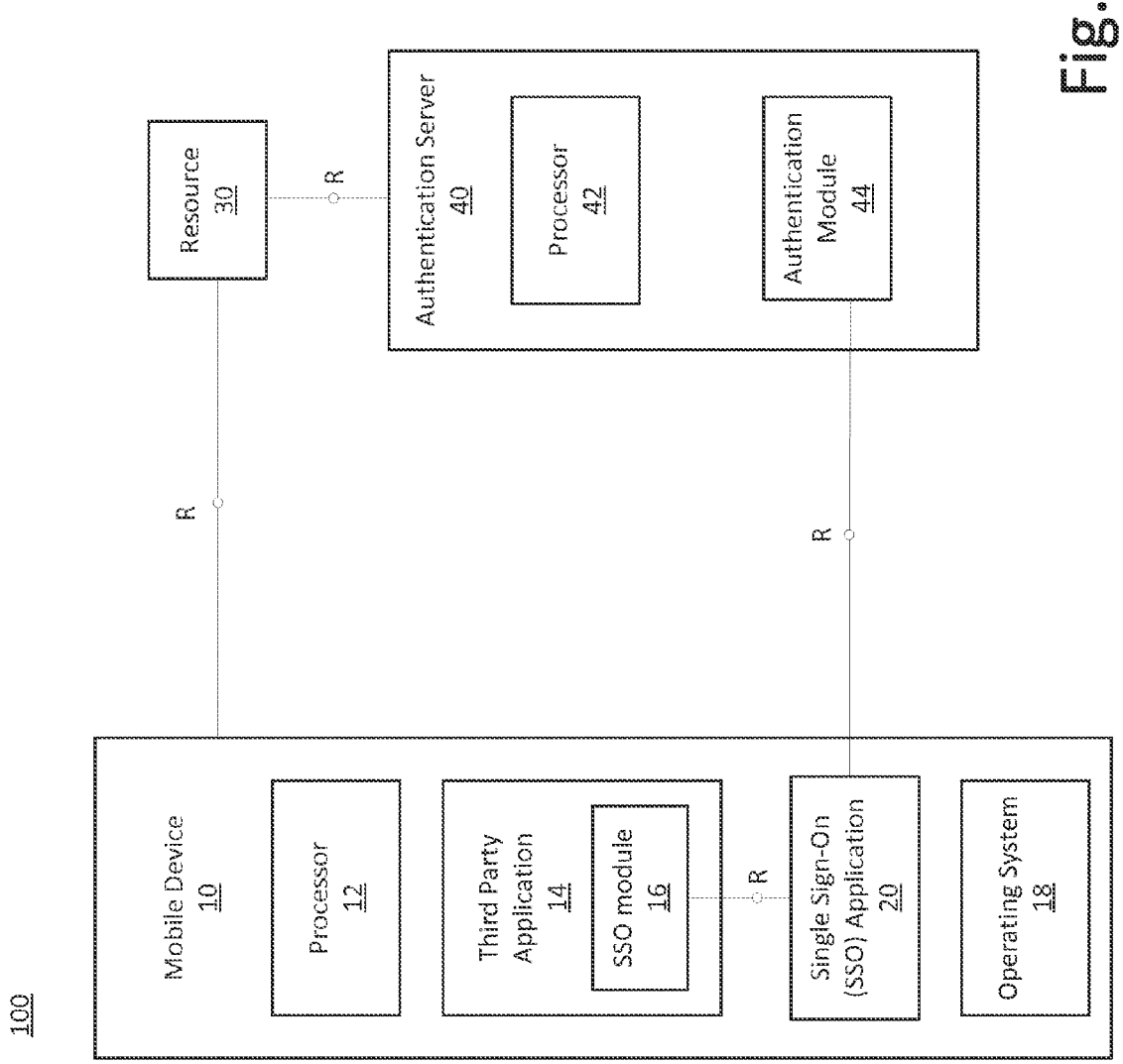
FIG. 1 is a block diagram of a system for secure communication according to an example embodiment of the present invention.

FIG. 1 is a block diagram of a system 100 according to an example embodiment of the present invention. The system 100 includes a mobile device 10, a private resource 30 and an authentication server 40. The mobile device 10 wirelessly communicates with the resource 30 and the server 40 over networks that may include a cellular network and one or more public and/or private computing networks such as the Internet. Such networks are standard in mobile communications and will not be described further. In an example embodiment, the resource 30 is a web service that provides access to data using a standard networking protocol such as Hypertext Transfer Protocol (HTTP). The data may include, for example, enterprise data accessed by company employees, customers, business partners, etc. In an enterprise setting, the resource 30 may not be publically accessible. Instead, authentication of the third-party app is required for access.

The mobile device 10 may be a tablet, a smartphone or any other wireless device that can communicate with the resource 30 using the standard networking protocol. The mobile device 10 may include a processor 12 and a memory storing an operating system 18, a third-party app 14 and an intermediary program 20. In the example embodiments described herein, the intermediary program 20 is referred to as a single sign-on (SSO) app for reasons that will soon be explained. The SSO app 20 may handle access requests for other third-party apps besides the third-party app 14. The additional third-party apps have been omitted from the drawings for simplicity, but interact with the SSO app 20 in the same manner as the third-party app 14.

Each third-party app may include an SSO module 16 that interfaces with the SSO app 20. The SSO module 16 may include a standardized client library that supplements the code of the third-party app to allow access to the functionality provided by the SSO app 20, as described herein. The SSO module 16 simplifies integration between the third-party app 14 and the SSO app 20 so that publishers of third-party apps need not be concerned with writing additional code to interact with the SSO app 20. In this regard, the SSO module 16 may be implemented as an add-on, e.g., a software update or plug-in. In an example embodiment, intra-device and inter-device communication occur over Representational State Transfer (REST) interfaces, which are labeled "R" in FIG. 1. Alternative communication interfaces, such as Simple Object Access Protocol (SOAP) are also possible.

The SSO app 20 is a trusted app that may be provided, for example, by an administrator or other entity associated with the server 40. The SSO app 20 may store user credentials such as a username and/or a password. This allows the user to indirectly sign onto each of the third-party apps by supplying the user credentials only once, to the SSO app 20. Thus, the user credentials need not be supplied directly to each third-party app by the user. When the user signs on, the SSO app 20 checks the user credentials against stored credentials, which may be stored in an encrypted format for protection against unauthorized access. The SSO app 20 may include a user interface by which the user can modify the user credentials, e.g., by changing to a new password when an existing password has been compromised.

The operating system 18 is platform dependent and serves as a software interface between hardware of the device 20 and programs on the device 20, such as the third-party app 14 and the SSO app 20. Example operating systems 18 for mobile devices include Android and iOS. However, the example embodiments may be compatible with, or extended to support, other mobile operating systems.

The authentication server 40 may be an enterprise computing device operated by a company administrator. The authentication server 40 may be, but need not be, the computing device that provides the resource 30. The authentication server 40 may include a processor 42 and an authentication module 44 that generates an access token for the third-party app 14 using an authorization code, which is granted by the server 40 in response to determining that that third-party app 14 is authorized to obtain access tokens. The authorization code is returned to the authentication server 40 by the third-party app 14 or, alternatively, by the SSO app 20 on behalf of the third-party app 14. The authorization code is then exchanged for the access token, which ultimately allows the third-party app 14 to access the resource 30. Authorization codes and access tokens are one method in which apps are authorized according to the OAuth protocol and will not be described in further detail. However, it is noted that the authorization code is a code that is uniquely generated for the third-party app 14 after the authorization server 40 authenticates the third-party app 14 based on information that identifies the third-party app 14. The authorization code is a one-time use code that allows the third-party app 14 to obtain a single access token, after which the authorization code is no longer effective for obtaining further access tokens.

Figure 2:
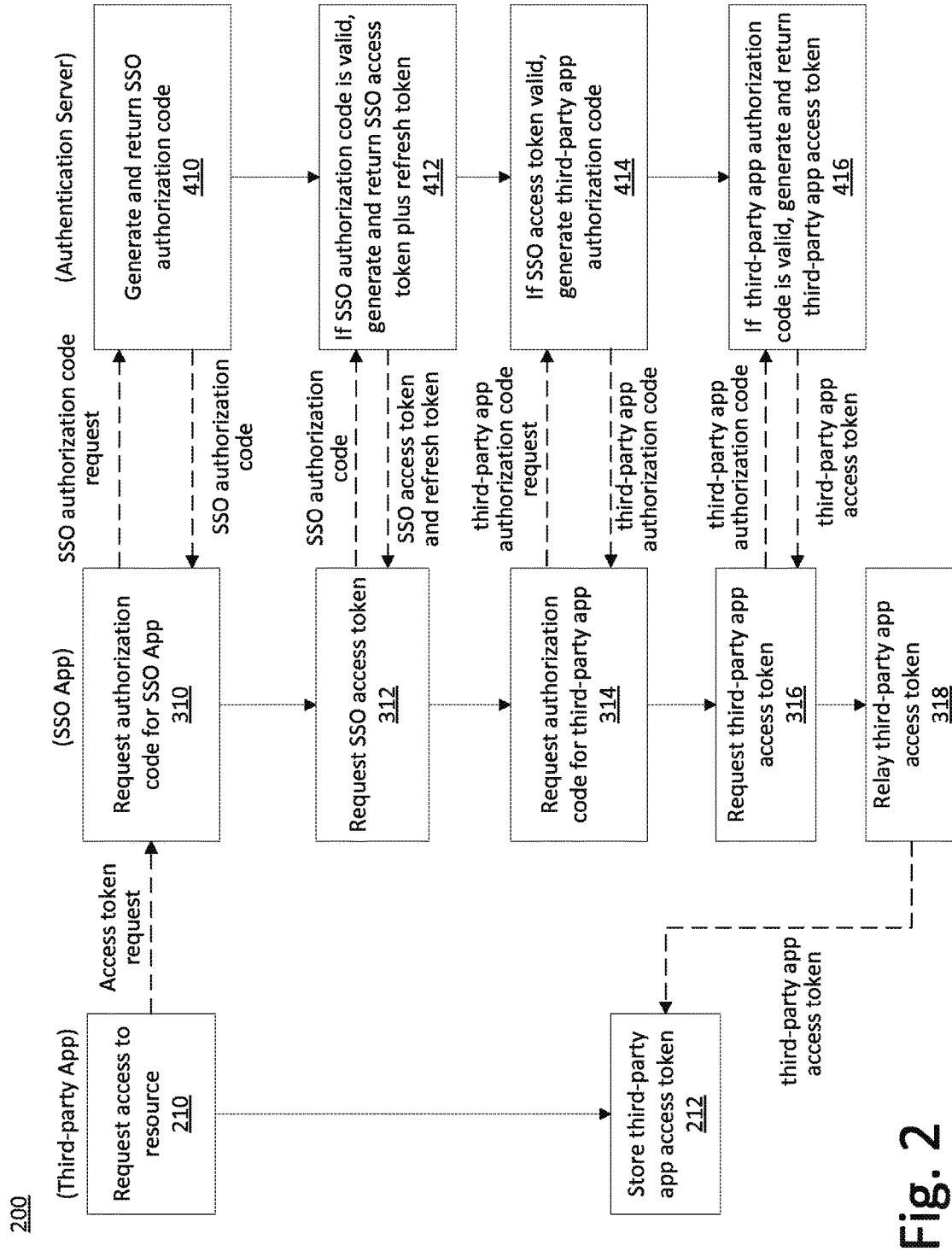
FIG. 2 is a flowchart of a method for secure communication according to an example embodiment of the present invention.

FIG. 2 is a flowchart of a method 200 for secure communication, according to an example embodiment of the present invention. The method 200 may be performed using the system 100. In FIG. 2, the left, middle, and right columns correspond to steps that may be performed by the third-party app 14, the SSO app 20, and the authentication server 40, respectively. Dashed arrows represent communications between the various system components.

At step 210, the third-party app 14 transmits an access token request to the SSO app 20. The request may occur via a REST interface and with the aid of the SSO module 16.

At step 310, the SSO app 20 responds to the access token request by transmitting an SSO authorization code request to the authentication server 40. As with the communication between the third-party app 14, communication between the SSO app 20 and the authentication server 40 may occur via a REST interface. The SSO authorization code request may include information identifying the SSO app 20. For example, in Android the identifying information may include a package name and a certificate. In iOS, the identifying information may be a bundle ID.

At step 410, the authentication server 40 responds to the SSO authorization code request by verifying the information identifying the SSO app 20. If the information matches stored information associated with the SSO app 20, the authentication server 40 generates the SSO authorization code and returns it to the SSO app 20.

At step 312, the SSO app 20 transmits the SSO authorization code back to the authentication server 40 so that the SSO authorization code can be exchanged for an SSO access token that gives the SSO app 20 permission to access the resource 30. It should be noted, however, that the SSO app 20 may not actually access the resource 30 using this token, which merely provides the SSO app 20 with the ability to obtain a similar permission on behalf of the third-party app 14, as explained below.

At step 412, the authentication server 40 checks the SSO authorization code for validity. If the SSO authorization code is valid, the authentication server 40 generates and returns the SSO access token together with a refresh token. The SSO authorization code is also invalidated so that further access tokens cannot be obtained using the same SSO authorization code.

At step 314, the SSO app 20, having been authenticated by the server 40, can now request an authorization code on behalf of the third-party app 14. The third-party app authorization code is analogous to the SSO authorization code and may be exchanged for an additional token that allows the third-party app 14 to access the resource 30. The third-party app authorization code request may include information identifying the third-party app 14, e.g., a bundle ID.

At step 414, the authentication server 40 responds to the third-party app authorization code request by verifying the information identifying the third-party app 14. If the information matches stored information associated with the third-party app 14, the authentication server 40 generates the third-party app authorization code and returns it to the third-party app 14.

At step 316, the SSO app 20 transmits the third-party app authorization code back to the authentication server 40 so that the third-party app authorization code can be exchanged for a third-party app access token.

At step 416, the authentication server 40 checks the third-party app authorization code for validity. If the third-party app authorization code is valid, the authentication server 40 generates and returns the third-party app access token. The third-party app authorization code is also invalidated.

At step 318, the SSO app 20 relays the third-party app access token to the third-party app 14, which stores the third-party app access token in a local storage, e.g., in a memory area reserved for use by the third-party app 14 (step 212). Alternatively, the SSO app 20 may store the third-party app access token on behalf of the third-party app 14, e.g., in a local storage area reserved for the SSO app 20. In this manner, the SSO app 20 can manage access tokens for a plurality of third-party apps, similar to the management of user credentials described earlier. The third-party app access token can then be presented to the resource 30 as proof of authentication, allowing the third party app 14 to access the resource 30. In a separate step not shown, information for verifying the third-party app access token may be transmitted to the resource 30. This additional step may be omitted where, for example, the resource 30 is located at the authentication server 40.

Figure 3:
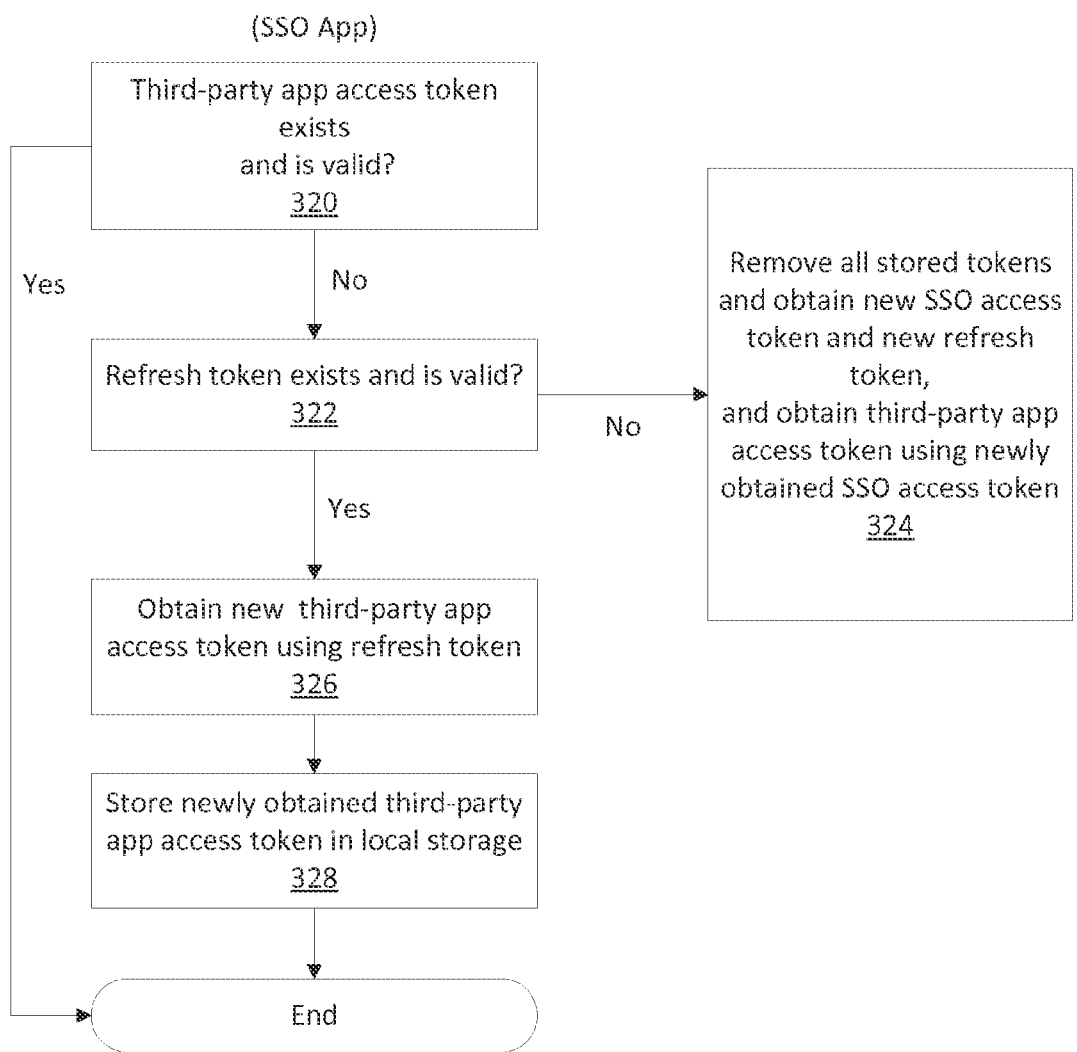
FIG. 3 is a flowchart of a method for obtaining access tokens by an intermediary program according to an example embodiment of the present invention.

As explained earlier, the SSO app 20 obtains its own access token together with a refresh token and the SSO access token allows the SSO app 20 to obtain the third-party app access token on behalf of the third-party app 14. The role of the refresh token will now be explained in connection with the method 300 of FIG. 3. In an example embodiment, the SSO access token and the third-party app access token are valid only for a specified time period, after which the access tokens automatically expire. The method 300 may be performed at the SSO app 20 when a previously stored third-party app access token is no longer valid. The method 300 may also be performed in response to the access token request at step 210 in the method 200, that is, when the third-party app 14 obtains its access token for the first time.

At step 320, the SSO app 20 determines whether a third-party app access token exists and if so, whether the third-party app access token is valid. This step may alternatively be performed by the third-party app 14, for example, when the third-party app 14 stores its own access token. If the third-party app access token is valid, the method 300 ends.

If the third-party app access token is invalid or does not exist, the SSO app 20 determines whether a valid refresh token exists. If not, then all stored tokens are removed from local storage (step 324) and a new SSO access token is obtained together with a new refresh token, which in turn is used to obtain a new third-party app access token from the authentication server 40.

If a valid refresh token exists, the SSO app 20 obtains a new third-party app access token using the refresh token (step 326). Unlike the SSO access token and the third-party app access token, the refresh token does not expire. However, the refresh token may be invalidated at the server 40, for example by the administrator.

At step 328, the newly obtained third-party app access token is stored in the local storage, for example by overwriting the invalid third-party app access token. Thus, the method 300 enables the SSO app 20 to obtain new third-party app access tokens when they expire.

Figure 4:
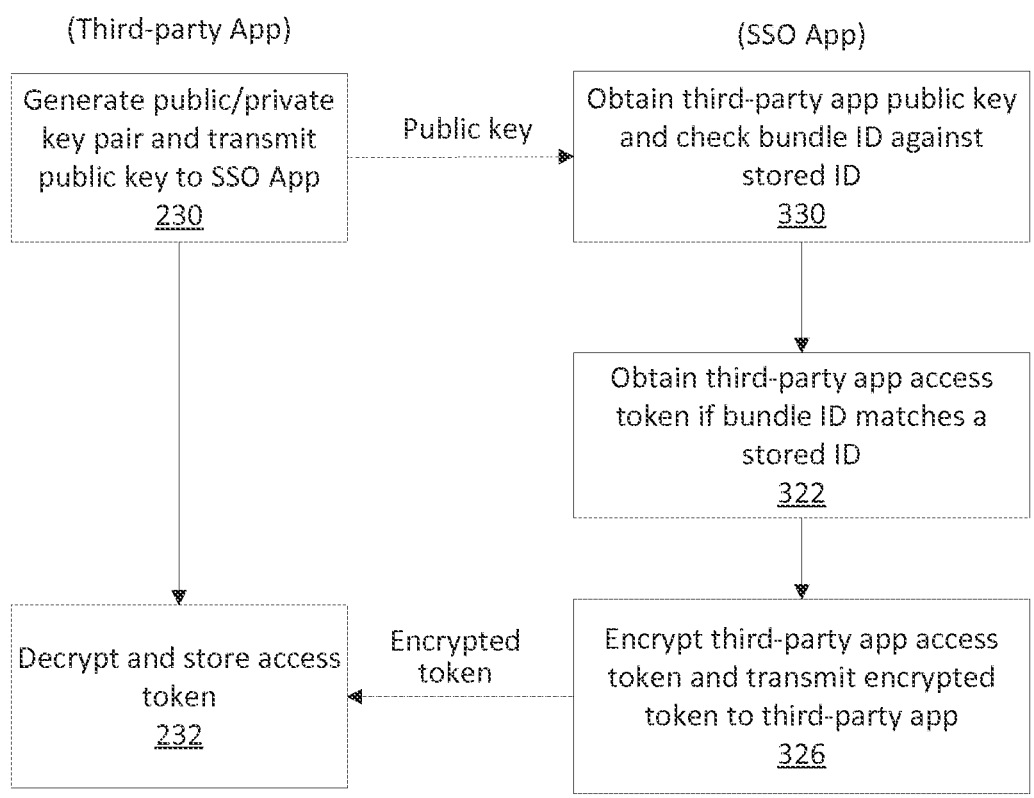
FIG. 4 is a flowchart of a method for secure transmission of an access token according to an example embodiment of the present invention.

FIG. 4 is a flowchart of a method 400 for secure transmission of an access token, according to an example embodiment of the present invention. In mobile operating systems, each app that is installed on a mobile device has an identifier. For example, in iOS, each installed app has a bundle ID and only one instance of the same bundle ID is allowed on any given device. Nevertheless, communication between the apps may be unsecured. Returning to the iOS example, messages are directed to installed apps based on uniform resource locator (URL) schemes, which publishers can freely define. Thus, two apps may share the same URL scheme so that there is no guarantee that a message will actually be received by an intended app when there exists another app sharing the same URL scheme. Regardless of whether the interception of the messages is accidental or the result of a malicious program purporting to be the intended app, the interception should be prevented. This is especially important when privileged information such as a third-party app access token is transmitted. The method 400 solves this problem.

At step 230, the third-party app 14 generates a public/private key pair. The third-party app 14 stores the private key locally so that the private key is accessible only by the third-party app 14. The public key is transmitted to the SSO app 20.

At step 330, the SSO app 20 receives the public key and may, as a cursory check of the authenticity of the third-party app 14, compare the bundle ID of the third-party app 14 against a list of stored bundle IDs corresponding to third-party apps that have been approved by an entity associated with the SSO app 20 and the authentication server 40.

At step 322, the SSO app 20 obtains the third-party app access token, for example, in accordance with the methods described earlier. If the SSO app 20 performs the checking in step 330, the token request may be prevented from issuing when no match is found. Alternatively, the check may be performed at the authentication server 40 in response to the third-party app access token request.

At step 326 the SSO app 20 encrypts the third-party app access token using the public key and transmits the encrypted token to the third-party app 14.

At step 232, the third-party app 14 receives the encrypted token and decrypts it using the private key, then stores the access token for subsequent use.

Although the method 400 is described in connection with encryption of access tokens, it will be appreciated that the encryption may also be applied to any data transmitted between the third-party app 14 and the SSO app 20. For example, messages from the third-party app 14 to the SSO app 20 may be encrypted using the private key and decrypted at the SSO app 20 using the public key.

In some instances, it may be possible to securely transmit data between a third-party app and the SSO app 20 without encryption. Thus, encryption of access tokens (or any other data) is not necessarily required. For example, Android apps are signed with a publisher's certificate and are additionally assigned a package name. Although the same certificate may be associated with multiple apps, the certificate is generally not shared with other entities besides the publisher for whom the certificate was issued. Thus, in an alternative embodiment, the certificate may be used to verify the authenticity of third-party apps attempting to communicate with the SSO app 20. However, the certificate alone is insufficient to uniquely identify the third-party app. Therefore, in an embodiment, the certificate is combined with additional information that, together with the certificate, uniquely identifies the third-party app. For example, the additional information may include the package name.

In an embodiment, the certificates need not be transmitted between the third-party app 14 and the SSO app 20. Instead, the third-party app 14 may apply a hash algorithm to the certificate and transmit the hash result together with the package name to the SSO app 20, for example, in connection with an access token request. The SSO app 20 may compare the hash result and the package name to stored hash results and corresponding package names. If no match is found, the SSO app 20 does not transmit the token. As with the bundle ID in the method 400, the hash result/package name may alternatively be checked at the authentication server 40.

Figure 5:
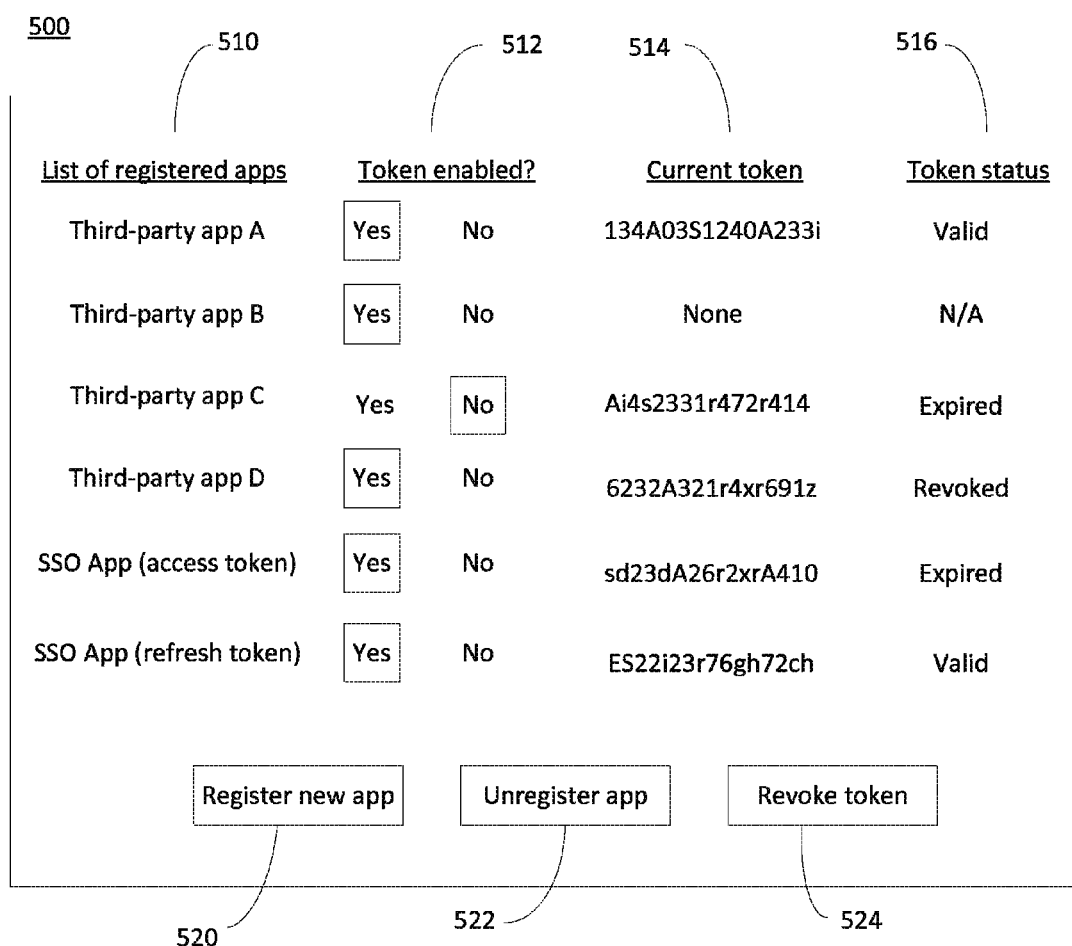
FIG. 5 is a graphical user interface for management of access tokens according to an example embodiment of the present invention.

An example embodiment of the present invention is directed to the dynamic configuration of access by third-party apps to private resources. FIG. 5 is an example embodiment of a graphical user interface 500 by which the administrator can dynamically configure third-party apps that have been registered to the authentication server 40. The interface 500 includes a list of registered apps 510, token enable settings 512, current token values 514, and current token statuses 516. For illustration purposes, the current tokens 514 are shown as sixteen digit alphanumeric strings. However, the actual format of the tokens may vary.

In FIG. 5, a token enable setting 512 of "yes" means that the app is allowed to obtain new access tokens. The administrator may, at any time, disallow new tokens by changing the token enable setting to "no" for any particular app, including the SSO app.

The interface 500 includes options to register new apps (520), unregister an app (522) and revoke tokens (524). While any an access token request will be accepted for processing if the requesting app is registered, the authentication server 40 may only issue tokens for those apps that have a token enable setting of "yes." Additionally, individual tokens may be manually revoked using the option 524. Manual revocation may cause the token enable setting 512 to be changed to "no," so that the app associated with the revoked token can no longer obtain access tokens despite being registered.

An example embodiment of the present invention is directed to one or more processors, which can be implemented using any conventional processing circuit and device or combination thereof, e.g., a CPU of a Personal Computer (PC) or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a non-transitory, hardware computer-readable medium, e.g., as described above, on which are stored instructions executable by a processor to perform any one or more of the methods described herein.

An example embodiment of the present invention is directed to a method, e.g., of a hardware component or machine, of transmitting instructions executable by a processor to perform any one or more of the methods described herein.

The above description is intended to be illustrative, and not restrictive. Those skilled in the art can appreciate from the foregoing description that the present invention may be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings and specification. Further, steps illustrated in the flowcharts may be omitted and/or certain step sequences may be altered, and, in certain instances multiple illustrated steps may be simultaneously performed.

What is claimed is:

1. A method for secure communication in a mobile computing device, comprising:
   receiving, by a first program installed on the mobile computing device, an access token request from a second program installed on the mobile computing device and separate from the first program, wherein the first program is a single sign-on (SSO) application;
   requesting, by the first program and in response to the access token request, a first program authorization code from an authentication server;
   obtaining, by the first program, the first program authorization code from the authentication server after a verification of the first program by the authentication server;
   submitting, by the first program, the first program authorization code to the authentication server with a request to obtain a first access token;
   obtaining, by the first program after a verification of the first program authorization code by the authentication server, the first access token from the authentication server through a first token request;
   submitting, by the first program, the first access token to the authentication server, wherein if the first access token is valid, the authentication server returns an authorization code usable by the first program to request a second access token from the authentication server;
   submitting the second access token directly to a remote resource by the mobile computing device;
   applying, by the second program, a hash algorithm to a publisher's certificate and transmitting a hash result with the access token request;
   including a list of registered applications, token enable settings, current token values, and current token statuses within a user interface of the mobile computing device; and
   wherein the remote resource is located remotely from the mobile computing device;
   wherein the second access token is submittable by the second program installed on the mobile computing device to the remote resource located remotely from the authentication server as proof that the second program has been authenticated by the authentication server, thereby granting the second program access to data at the remote resource; and
   wherein the first access token is not shared with the second program.

2. The method of claim 1, wherein the second access token is an Open Authorization (OAuth) access token.

3. The method of claim 1, wherein the authentication server returns the first access token to the first program together with a refresh token, wherein the first access token and the second access token each has an expiration period, and wherein the refresh token does not expire and is usable to request a replacement for the second access token when the second token expires.

4. The method of claim 3, wherein the refresh token is an Open Authorization (OAuth) refresh token.

5. The method of claim 1, further comprising:
   storing a user credential;
   comparing, by the first program, a user supplied credential to the stored user credential; and
   signing the user onto the second program and at least one additional program on the mobile computing device in response to determining that the user supplied credential matches the stored user credential.

6. The method of claim 1, further comprising:
   encrypting the second access token using a public key of the second program; and
   transmitting the encrypted second access token from the first program to the second program.

7. The method of claim 1, further comprising:
   receiving, by the first program, information identifying the second program, wherein the second access token is obtained only when the identifying information matches stored information associated with the second program.

8. The method of claim 7, further comprising:
   transmitting the second access token from the first program to the second program without encryption when the identifying information uniquely identifies the second program.

9. The method of claim 1, wherein the first access credential is revocable by the authentication server.

10. A system for secure communication in a mobile computing device, comprising:
    an authentication server; and
    a mobile device on which a first program and a second program are installed, wherein:
    the first program is a single sign-on (SSO) application;
    the first program obtains a first access token from the authentication server through a first token request;
    the first access token is not shared with the second program;
    the first program submits the first access token to the authentication server;
    if the first access token is valid, the authentication server returns an authorization code usable by the first program to request a second access token from the authentication server;
    the second program submits the second access token to a remote resource located remotely from the authentication server as proof that the second program has been authenticated by the authentication server;
    the second program accesses data at the remote resource in response to a successful verification of the second access token;
    the second access token is submitted directly to the remote resource by the mobile computing device;
    the second program applies a hash algorithm to a publisher's certificate and transmits a hash result with the access token request;
    a list of registered applications, token enable settings, current token values, and current token statuses is included within a user interface of the mobile computing device; and
    the remote resource is located remotely from the mobile computing device.

11. The system of claim 10, wherein the second access token is an Open Authorization (OAuth) access token.

12. The system of claim 10, wherein:
    the authentication server returns the first access token to the first program together with a refresh token;
    the first access token and the second access token each has an expiration period; and
    the refresh token does not expire and is usable to request a replacement for the second access token when the second token expires.

13. The system of claim 12, wherein the refresh token is an Open Authorization (OAuth) refresh token.

14. The system of claim 10, wherein:
    a user credential is stored on the mobile computing device;

the first program compares a user supplied credential to the stored user credential; and the first program signs the user onto the second program and at least one additional program on the mobile computing device in response to determining that the user supplied credential matches the stored user credential.

15. The system of claim 10, wherein:

the first program encrypts the second access token using a public key of the second program; and the first program transmits the encrypted second access token to the second program.

16. The system of claim 10, wherein:

the first program receives information identifying the second program; and the second access token is obtained only when the identifying information matches stored information associated with the second program.

17. The system of claim 16, wherein:

the first program transmits the second access token to the second program without encryption when the identifying information uniquely identifies the second program.

18. The system of claim 10, wherein the second access token is revocable by the authentication server.

19. The method of claim 7, wherein the information identifying the second program includes (i) a package name together with the publisher's certificate or (ii) a bundle ID.

20. The system of claim 16, wherein the information identifying the second program includes (i) a package name together with the publisher's certificate or (ii) a bundle ID.

* * * * *